(12) United States Patent
Chevillot et al.

(10) Patent No.: US 9,234,462 B2
(45) Date of Patent: Jan. 12, 2016

(54) FLUIDIC DAMPENING FILM SUPPLY METHOD FOR A GUIDING BEARING OF A TURBINE ENGINE SHAFT

(75) Inventors: Fabrice Chevillot, Epinay sous Senart (FR); Serge Rene Morreale, Guignes (FR)

(73) Assignee: SNECMA, Paris (FR)

( * ) Notice: Subject to any disclaimer, the term of this patent is extended or adjusted under 35 U.S.C. 154(b) by 787 days.

(21) Appl. No.: 13/546,526

(22) Filed: Jul. 11, 2012

(65) Prior Publication Data

US 2013/0022446 A1 Jan. 24, 2013

(30) Foreign Application Priority Data

Jul. 21, 2011 (FR) ...................................... 11 56611

(51) Int. Cl.
| | |
|---|---|
| *F16F 15/023* | (2006.01) |
| *F01D 25/04* | (2006.01) |
| *F02C 7/06* | (2006.01) |
| *F01D 25/16* | (2006.01) |
| *F01D 25/18* | (2006.01) |
| *F16C 27/04* | (2006.01) |

(52) U.S. Cl.
CPC ................ *F02C 7/06* (2013.01); *F01D 25/164* (2013.01); *F01D 25/18* (2013.01); *F16C 27/04* (2013.01); *F16C 27/045* (2013.01); *F16F 15/0237* (2013.01); *F05D 2260/96* (2013.01)

(58) Field of Classification Search
CPC ....... F01D 7/02; F16C 27/045; F16F 15/0237
See application file for complete search history.

(56) References Cited

U.S. PATENT DOCUMENTS

| | | | | | |
|---|---|---|---|---|---|
| 3,124,395 | A | * | 3/1964 | Sternlicht | ...................... 384/110 |
| 4,767,223 | A | * | 8/1988 | Goodwin | ...................... 384/114 |
| 4,947,639 | A | * | 8/1990 | Hibner et al. | ................... 60/772 |
| 2009/0015085 | A1 | | 1/2009 | Nakajima | |
| 2011/0046933 | A1 | | 2/2011 | Skelly et al. | |

FOREIGN PATENT DOCUMENTS

| | | |
|---|---|---|
| DE | 10 2006 026 123 B3 | 1/2008 |
| GB | 2 218 751 A | 11/1989 |
| JP | 58 -152951 | 9/1983 |
| WO | WO 2010/000958 A2 | 1/2010 |

OTHER PUBLICATIONS

French Preliminary Search Report and Written Opinion issued Mar. 5, 2012 in corresponding French Application No. 11 56611 filed on Jul. 21, 2011 (with an English Translation of Categories).

* cited by examiner

*Primary Examiner* — Craig Kim
*Assistant Examiner* — Jason Davis
(74) *Attorney, Agent, or Firm* — Oblon, McClelland, Maier & Neustadt, L.L.P.

(57) ABSTRACT

A fluidic dampening film supply method for a guiding bearing of a turbine engine shaft, said turbine engine being known to vibrate according to at least one given vibratory mode, said turbine engine being adapted to enter in resonance at a given resonance speed ($w_r$) for said given vibratory mode, a monitoring range (P) being defined around the resonance speed ($w_r$), a method wherein the fluidic dampening film of the guiding bearing being only supplied with fluid when the rotation speed of the turbine engine belongs to the monitoring range (P).

4 Claims, 3 Drawing Sheets

FLUIDIC DAMPENING FILM SUPPLY METHOD FOR A GUIDING BEARING OF A TURBINE ENGINE SHAFT

BACKGROUND OF THE INVENTION

1. Field of the Invention

The present invention relates to the field of guiding bearings for a turbine engine shaft and, more precisely, a fluidic dampening film supply method for a guiding bearing.

2. Description of the Related Art

The guiding bearings being used in a turbine engine include an internal ring and an external ring enclosing rolling members, for example rolls. Conventionally, the external ring is integrally mounted on a fixed part of the turbine engine and the internal ring is integrally mounted on a turbine engine shaft, for example by shrunk-fitting. The bearing thus allows the rotating shaft to be guided relative to the fixed part of the turbine engine.

In some configurations, the bearing is mounted between two rotating shaft of the turbine engine. Such a bearing is currently called "inter-shaft" bearing, such a bearing being for example known from the patent application FR 2,939,843 A1 from SNECMA Company.

As an example, referring to FIG. 1, a turbo-jet for an aircraft conventionally comprises several rotating turbine shafts, a high pressure shaft HP of which is rotationally mounted relative to a low pressure shaft BP via an inter-shaft guiding bearing 1. The guiding bearing 1 comprises an external ring 11 being integral with a part of the low pressure shaft BP and an internal ring 12 being integral with a part of the high pressure shaft HP and rolling means 13 enclosed by the ring 11, 12. In this example, the internal ring 11 is shrunk-fitted on the high pressure shaft HP so as to prevent any translation and any rotation of the internal ring 12 of the bearing 1 relative to the high pressure shaft HP. In order to dampen the movements of the shafts BP, HP, the guiding bearing 1 comprises a fluidic dampening film 14 captured between the external ring of the bearing 1 and the rolling means 13 of the bearing 1 thanks to seals, not shown.

A fluidic dampening film 14 of a guiding bearing 1, being known from the man of the art under the designation "squeeze-film" allows the dynamical response of the turbine engine to be improved at a given operation speed. Preferably, the fluidic dampening film comprises oil under pressure. It enables for example to limit the vibrations of the turbine engine during the operation thereof. Conventionally, the turbine engine comprises a main supplying pump 2 being adapted to supply the fluidic dampening film 14 at a supplying pressure Pp which is a function of the turbine engine speed. Thus, the supplying pressure of the fluidic dampening film 14 is higher at high speed (take-off phase of the aircraft) than at low speed. In practice, the supplying pressure of the dampening film is not sufficient at low speed and dampening is not optimal.

In order to obtain the desired dampening and avoid the cavitation of the oil film in the guiding bearing, it is known to increase the oil supplying pressure of the fluidic dampening film 14 with the help of an additional supplying pump 3 being known from the man of the art under the designation "boost-pump". At low speed, the additional supplying pump advantageously allows an additional pressure Pa to be supplied in order to compensate for a defect of the supplying pressure Pp of the main supplying pump 2 so that the fluidic dampening film 14 is supplied at the increased supplying pressure.

In practice, the additional supplying pump 3 is activated at low speed so as to increase the supplying pressure up to a target pressure enabling to bring some dampening to the turbine engine. When the rotation speed of the turbine engine is sufficient to allow the main supplying pump 2 to supply the appropriate supplying pressure, the additional supplying pump 3 is inactivated.

It has been observed that, in spite of a supply of the dampening film at the optimum supplying pressure thereof over its speed range, the amplitudes of the vibrations in the turbine engine are not optimally reduced.

BRIEF SUMMARY OF THE INVENTION

In order to eliminate at least some of these drawbacks, the invention relates to a fluidic dampening film supply method for a guiding bearing of a turbine engine shaft, said turbine engine being known to vibrate according to at least one given vibratory mode, said turbine engine being adapted to enter in resonance at a given resonance speed for said given vibratory mode, a monitoring range being defined around the resonance speed, a method where the fluidic dampening film of the guiding bearing is only supplied with fluid when the rotation speed of the turbine engine belongs to the monitoring range.

Advantageously, the fluidic dampening film is only activated when the turbine engine speed is close to the resonance speed for a given vibratory mode. Thus, the vibrations of the turbine engine are optimally limited, the fluidic film being not activated when the rotation speed is stabilized, which limits the vibration transmission from the turbine engine to the wing and to the airplane.

Preferably, the amplitude of the vibrations in the turbine engine is obtained as a function of the rotation speed of the turbine engine. The amplitudes being obtained are compared and the speed range is deducted and the amplitude of the vibrations in the turbine engine is reduced when the fluidic dampening film is supplied, said range forming the monitoring range.

By analysing the effect of the fluidic dampening film on the amplitude of the vibrations upon the rotation of the turbine engine, the monitoring range is defined on a precise and optimal way to cancel the vibrations in a specific way for each turbine engine type.

According to one aspect of the invention, the amplitudes of the vibrations in the turbine engine are simulated by calculation from a nominal dynamical model of said turbine engine. Advantageously, the amplitudes of the vibrations are simulated by calculation so as to quickly define the monitoring range of a turbine engine for each of the vibratory modes thereof.

According to another aspect of the invention, the amplitudes of the vibrations in the turbine engine are measured on a physical turbine engine.

Advantageously, the amplitudes of the vibrations are measured in a precise way by trials. Advantageously, such trials are performed for each family of turbine engine.

Preferably, the fluidic dampening film of the guiding bearing being not supplied with fluid, the amplitude of the vibrations is the turbine engine is measured upon the operation of the turbine engine, the measured amplitude is compared to a first predetermined threshold and the fluidic dampening film of the guiding bearing is supplied with fluid upon a first threshold being exceeded.

Advantageously, the monitoring range is defined as a function of the amplitude of the vibrations in the turbine engine, which advantageously allows the fluidic dampening film to be activated around the resonance speed when the amplitude of the vibrations becomes high. Such a method is very interesting, since it allows different resonance ranges to be defined as a function of the turbine engines.

Preferably, the fluidic dampening film of the guiding bearing being supplied with fluid, the amplitude of the vibrations in the turbine engine is measured upon the operation of the turbine engine, the measured amplitude is compared to a second predetermined threshold and the fluid supplying of the fluidic dampening film of the guiding bearing is stopped if the measured amplitude is lower than the second threshold. The fluidic dampening film is stopped when the vibrations have a lower amplitude so as to improve the dynamical behaviour of the turbine engine and to limit the transmission of the vibrations from the turbine engine to the remaining aeronautical structure. Such a method is very interesting, since it allows different resonance ranges to be defined as a function of the turbine engines.

According to a preferred aspect of the invention, the first and second thresholds are the same for a determined vibratory mode. Thus, the supplying method is simple to be implemented, the fluidic film being only supplied when the amplitude level exceeds said threshold. Preferably, the first and second thresholds are the same for every vibratory mode in the turbine engine.

BRIEF DESCRIPTION OF THE SEVERAL VIEWS OF THE DRAWINGS

The invention will be better understood by reading the following description only given as an example and referring to the accompanying drawings, wherein.

DETAILED DESCRIPTION OF THE INVENTION

The figures show a non-limiting embodiment of the invention so as to implement the invention.

A turbine engine conventionally comprises a rotating shaft being guided in a turbine engine casing by one or more guiding bearings. It is known that, when the turbine engine is operating, the latter vibrates according to a plurality of vibratory modes. The amplitude of the vibrations of each of the vibratory modes in the turbine engine varies relative to the speed of the turbine engine (W). In practice, a turbine engine is never perfectly balanced and an unbalance remains, that has as a consequence to generate vibrations in the turbine engine for a given vibratory mode when the rotation speed of the turbine engine is close to a determined rotation speed for said given vibratory mode which is known as resonance. In practice, the rotation speed of the turbine engine for which the resonance is maximum is called resonance speed $w_r$.

Figure 1:
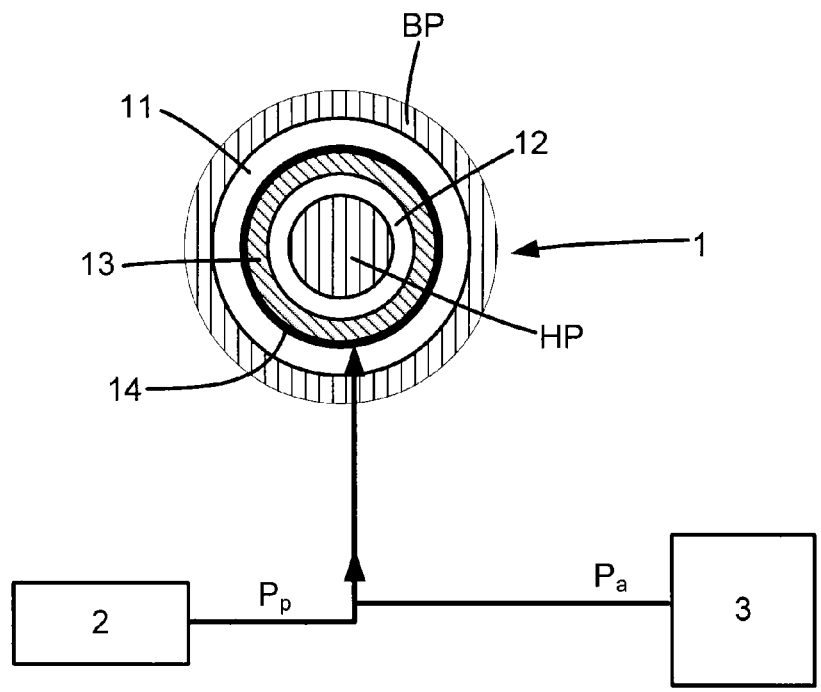
FIG. 1 is a schematic sectional view of a guiding bearing for a turbine engine shaft according to the prior art.
Figure 2:
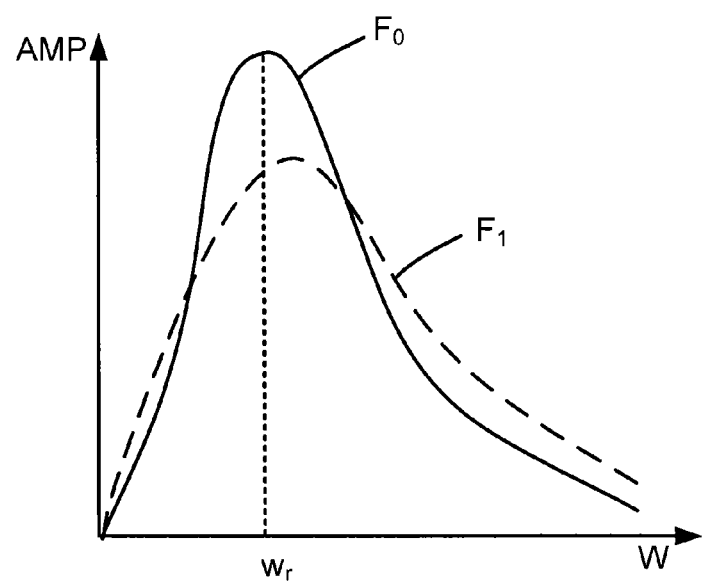
FIG. 2 represents the amplitude of the vibrations (AMP) of a shaft being guided by a guiding bearing as a function of the speed (W) of the turbine engine when the fluidic dampening film is supplied (F1) or not supplied (F0)

In order to limit the amplitude of the vibrations upon the operation of the turbine engine, the Applicant have analyzed the amplitude (AMP) of the vibrations in a turbine engine for a given vibratory mode as a function of the speed of the turbine engine (W) when the fluidic dampening film of the guiding bearing of the turbine engine is supplied (FIG. 2: graph F1) and when it is not (FIG. 2: graph F0).

Figure 3:
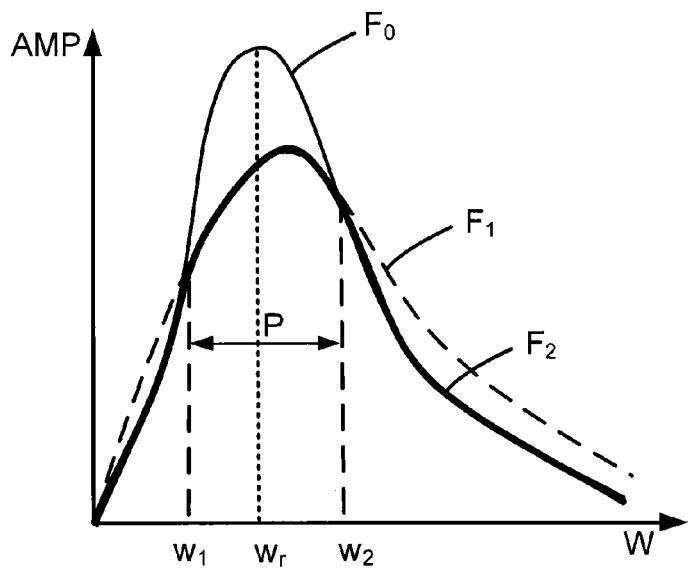
FIG. 3 represents the amplitude of the vibrations (AMP) of a shaft being guided by a guiding bearing as a function of the speed (W) of the turbine engine when the fluidic film is supplied (F2) according to the supplying method of the invention.

After analysis, it seems that the fluidic damping film being supplied only improves the vibratory behaviour of the turbine engine on a monitoring range P defined around the speed of resonance $w_r$ for the concerned vibratory mode as represented on FIG. 3. Indeed, when the fluidic dampening film is supplied for a rotation speed w higher than the speed of resonance $w_r$, dampening is not optimum.

Figure 4:
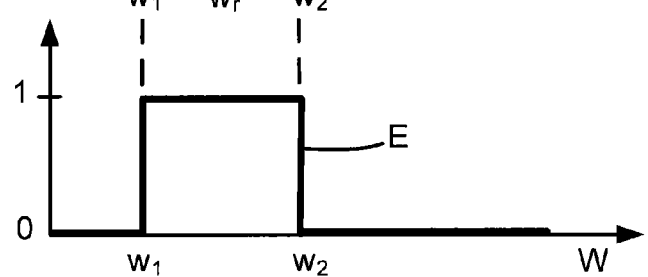
FIG. 4 represents the supplying graph of the fluidic dampening film of the guiding bearing according to the supplying method of the invention.

According to the invention, the fluidic dampening film is only supplied on the monitoring range P defined around the resonance speed $w_r$ according to the control profile E represented on FIG. 4. That allows the amplitude of the vibrations to be advantageously limited on the operating speed range of the turbine engine (FIG. 3: graph F2). In such example, the turbine engine comprises a controllable supplying pump to supply the fluidic dampening film only upon a determined rotation speed, here upon the monitoring range P.

The monitoring range P may be determined and calibrated on different ways as a function of the goal to be looked at.

Experimental Method

According to a first embodiment of the invention, the monitoring speed range P is defined between a lower limit $w_i$ and a higher limit $w_2$ being determined on a experimental way by trials on a physical turbine engine of the same type as the turbine engine on which it is desired to implement the supplying method according to the invention. In other words, trials are performed on a turbine engine of the same family so as to obtain the vibration amplitude graphs $F_0$, $F_1$ as a function of the operating speed w as represented on FIG. 3. The values of the limits $w_1$, $w_2$ of the monitoring range P are obtained by reading the abscissas at the intersections of the vibration graphs $F_0$, $F_1$ in FIG. 3. According to a particular implementation mode, the vibration graphs $F_0$, $F_1$ are only obtained partially by trials so as to define the intersections of the graphs $F_0$, $F_1$. As an example, by calculation, the limits $W_{1est}$, $w_{2est}$ of the monitoring range P are estimated from a nominal model of the turbine engine and trials are made for rotation speeds around the estimated limits $w_{1est}$, $w_{2est}$ so as to deduce the precise values of the limits $w_1$, $w_2$ for the physical turbine engine.

Then, the supplying pump is controlled according to the control profile E of FIG. 4 to supply the fluidic dampening film only between the limits $w_1$, $w_2$ of the monitoring range P being obtained by trials. Alternatively, so as to avoid using trials, the supplying pump may only be activated between the limits estimated by calculation $w_{1est}$, $w_{2est}$. Thus, the behavior of the turbine engine as a function of the operating speed thereof is improved for a given vibratory mode.

Alternatively, the monitoring range is defined by determining a speed margin centered around the resonance speed $w_r$ of the turbine engine for the concerned vibratory mode. As an example, the speed margin is defined as a fixed value or as a percentage of the resonance speed $w_r$. Preferably, the speed margin of a monitoring range P is defined as a function of the concerned vibratory mode so as to optimize dampening.

A fluidic dampening film supply method has been previously presented for a given vibratory mode M of the turbine engine. It goes without saying that the same method can be implemented for a plurality of vibratory modes $M_i$ of a same turbine engine so as to determine a plurality of resonance ranges $P_i$ during which the fluidic dampening film is supplied. Preferably, the fluidic dampening film is only supplied for the vibratory modes, the vibration amplitudes of which are the most important.

Method by Measurement of Vibrations

According a second embodiment of the invention, the turbine engine comprises, further to its controllable supplying pump, at least one vibration sensor adapted to measure the amplitude of the vibrations in the turbine engine. For a given vibratory mode, a first vibration threshold S1 and a second vibration threshold S2 are defined and continuously or by time intervals, the amplitude of the vibrations S measured by the vibration sensor is measured.

Figure 5:
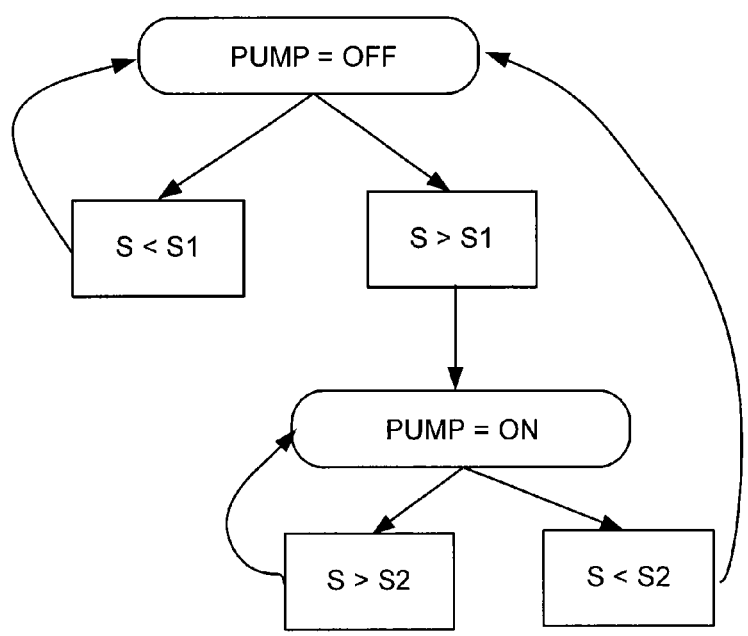
FIG. 5 is a diagram representing a particular implementation of the method according to the invention by measurement of the vibrations in the turbine engine.
Figure 6:
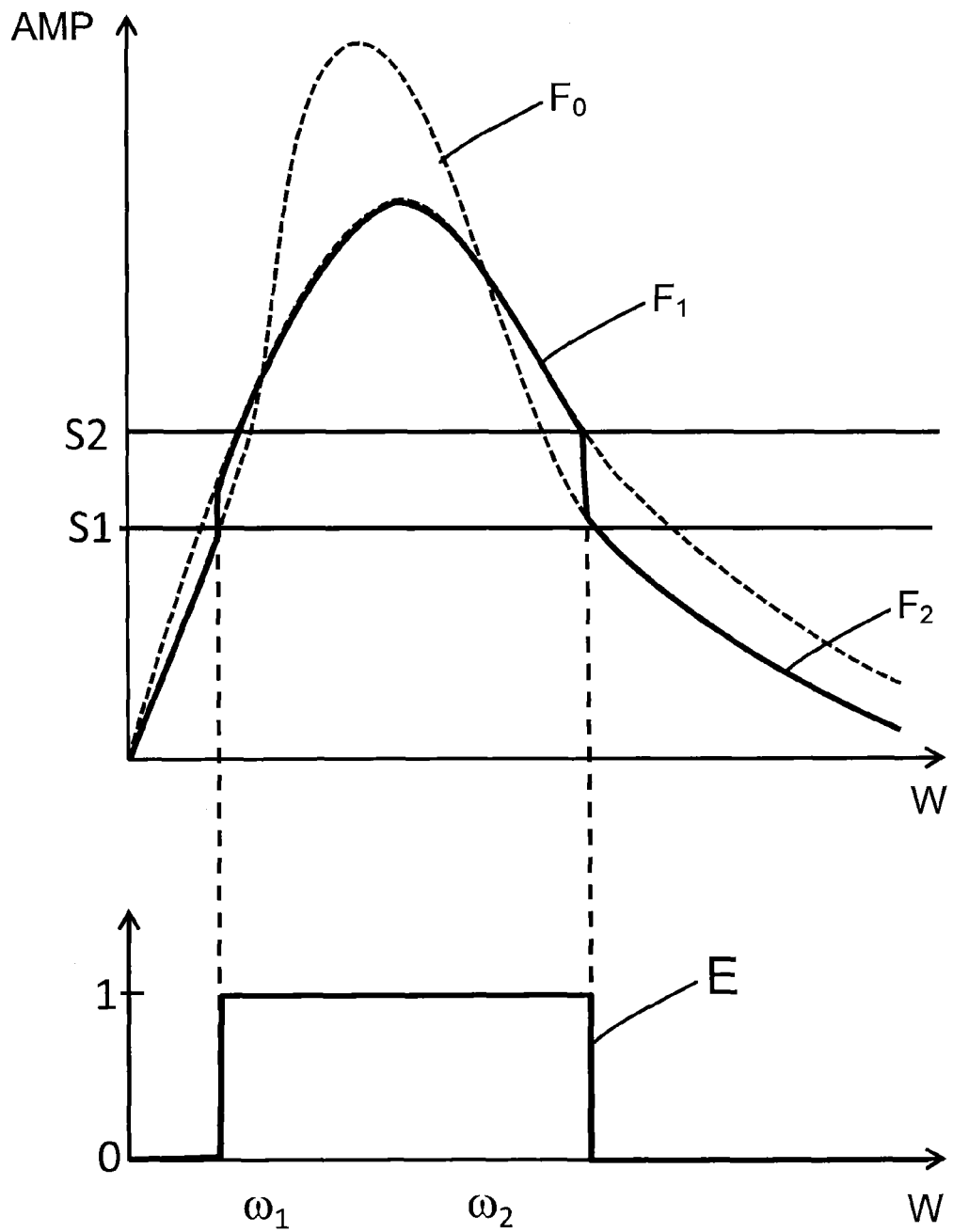
FIG. 6 represents the amplitude of the vibrations (AMP) of a shaft being guided by a guiding bearing as a function of the speed (W) of the turbine engine and the supplying graph of the fluidic dampening film of the guiding bearing according to the supplying method schematized on FIG. 5.

Referring to the diagram of FIG. 5 and to the graphs of FIG. 6, the supplying pump being inactivated (OFF), the supplying pump is activated (ON) only when the measured amplitude of vibrations S exceeds the first vibration threshold S1. Thus, the fluidic dampening film is supplied when the vibrations exceed a determined threshold so as to protect the turbine engine against any resonance phenomenon, which is quite advantageous.

Still referring to FIGS. 5 and 6, the supplying pump being activated (ON), the supplying pump is inactivated (OFF) only when the amplitude of the measured vibrations S is lower than the second vibration threshold S2. Thus, the fluidic dampening film is not supplied outside the resonance zone, thereby improving the dynamical behavior of the turbine engine.

Preferably, the first and second vibration thresholds S1, S2 are estimated by calculation or determined by experimental measurements performed on turbine engine. An estimate by calculation is simpler to be implemented, since it does not need to mobilize turbine engine. Preferably, the first and second vibration thresholds S1, S2 are the same so as to simplify the control of the supplying pump, the latter being then only supplied when the measured amplitude of the vibrations S exceeds the single vibration thresholds S1, S2.

According to one aspect of the invention, one or more vibration thresholds is or are provided for each of the vibratory modes of the turbine engine so as to control precisely the activation of the fluidic dampening film supply upon the operation of the turbine engine.

According to another aspect of the invention, only one vibration threshold is selected for all of the vibratory modes of the turbine engine, the latter being then protected by the fluidic dampening film upon excessive vibrations, the fluidic dampening film disturbing not the aerodynamic behaviour of the turbine engine within a stabilized speed outside the monitoring range P.

Advantageously, a protection system adapted to supply the fluidic dampening film is also provided in the case of the vibration sensor malfunction. In fact, it is important that the fluidic dampening film should be supplied when the speed of the turbine engine is close to the resonance speed.

The invention claimed is:

1. A fluidic dampening film supply method for a guiding bearing of a turbine engine shaft, said turbine engine being known to vibrate according to at least one given vibratory mode, said turbine engine being adapted to enter in resonance at a given resonance speed for said given vibratory mode, and a monitoring range being defined around the resonance speed, the method comprising:
   not providing a fluid supply of the fluidic dampening film for the guiding bearing;
   measuring an amplitude of vibrations in the turbine engine using at least one vibration sensor;
   comparing the measured amplitude to a first predetermined threshold;
   supplying the fluidic dampening film of the guiding bearing when the measured amplitude is greater than the first predetermined threshold;
   comparing the measured amplitude to a second predetermined threshold; and
   stopping the fluid supply of the fluidic dampening film of the guiding bearing if the measured amplitude is lower than the second predetermined threshold,
   wherein the fluidic dampening film is supplied when a rotational speed of the turbine engine shaft is within the monitoring range, and the fluidic dampening film is not supplied when the rotational speed of the turbine engine shaft is outside of the monitoring range.

2. The method according to claim 1, wherein the first and second predetermined thresholds are the same for a determined vibratory mode.

3. The method according to claim 2, wherein the first and second predetermined thresholds are the same for every vibratory mode.

4. The method according to claim 1, wherein the guiding bearing includes an external ring integral with a portion of a low pressure shaft of said turbine engine, an internal ring integral with a portion of a high pressure shaft of said turbine engine, and rolling means enclosed by said external and internal rings, and
   wherein the fluidic dampening film is supplied between said external ring and said rolling means.

* * * * *